(12) United States Patent
Khan et al.

(10) Patent No.: US 9,083,956 B2
(45) Date of Patent: Jul. 14, 2015

(54) SYSTEM AND METHOD FOR CREATING 3D VIDEO

(75) Inventors: Farooq Khan, Allen, TX (US); Kong Posh Bhat, Plano, TX (US); Ying Li, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 12/774,295

(22) Filed: May 5, 2010

(65) Prior Publication Data

US 2011/0074926 A1 Mar. 31, 2011

Related U.S. Application Data

(60) Provisional application No. 61/246,410, filed on Sep. 28, 2009.

(51) Int. Cl.
*H04N 13/02* (2006.01)
*H04N 13/00* (2006.01)

(52) U.S. Cl.
CPC ....... *H04N 13/0207* (2013.01); *H04N 13/0066* (2013.01); *H04N 13/0246* (2013.01)

(58) Field of Classification Search
CPC .......... H04N 13/0207; H04N 13/0066; H04N 13/0246
USPC .................. 348/46–48, 55; 396/325; 382/154
See application file for complete search history.

(56) References Cited

U.S. PATENT DOCUMENTS

| 5,398,095 A * | 3/1995 | Tsukamoto et al. ............ 396/86 |
| 5,661,518 A * | 8/1997 | Palm et al. ...................... 348/42 |
| 7,860,301 B2 * | 12/2010 | Se et al. ........................ 382/154 |
| 2003/0227555 A1 | 12/2003 | Kobayashi et al. |
| 2006/0187297 A1 | 8/2006 | Onural |
| 2008/0170806 A1 * | 7/2008 | Kim .............................. 382/285 |
| 2009/0008554 A1 | 1/2009 | Weir et al. |
| 2009/0116732 A1 * | 5/2009 | Zhou et al. .................... 382/154 |

FOREIGN PATENT DOCUMENTS

| GB | 2 370 443 A | 6/2002 |
| WO | 2006/104351 A1 | 10/2006 |

OTHER PUBLICATIONS

Ken Ward's Mathematics Pages, Feb. 26, 2008, Cosine Rule (Proof) section.*

* cited by examiner

*Primary Examiner* — Tat Chi Chio
*Assistant Examiner* — Nguyen Truong
(74) *Attorney, Agent, or Firm* — Jefferson IP Law, LLP

(57) ABSTRACT

A system and method for generating 3D video from a plurality of 2D video streams is provided. A video capture device for capturing video to be transformed into 3D video includes a camera module for capturing a two-dimensional (2D) video stream, a location module for determining a location of the video capture device, an orientation module for determining an orientation of the video capture device, and a processing module for associating additional information with the 2D video stream captured by the camera module, the additional information including the orientation of the video capture device and the location of the video capture device.

26 Claims, 11 Drawing Sheets

SYSTEM AND METHOD FOR CREATING 3D VIDEO

CROSS-REFERENCE TO RELATED APPLICATIONS

This application claims the benefit under 35 U.S.C. §119 (e) of a U.S. Provisional application filed on Sep. 28, 2009 in the U.S. Patent and Trademark Office and assigned Ser. No. 61/124,610, the entire disclosure of which is hereby incorporated by reference.

BACKGROUND OF THE INVENTION

1. Field of the Invention:

Aspects of the present invention relate to products such as mobile phones and cameras/camcorders for creating three dimensional (3D) video. More particularly, aspects of the present invention relate to creating 3D video using two dimensional (2D) cameras.

2. Description of the Related Art:

Multi-view or 3D video is becoming popular due to the availability of 3D displays and the growing use of multi-camera arrays. Multi-view capture uses arrays of cameras to capture a 3D scene through multiple independent video streams. Plenoptic cameras, which capture the light field of a scene, can also be used to capture multiple views with a single main lens.

Multiview Video Coding (MVC) is an amendment to the H.264/Motion Picture Expert Group (MPEG)-4 Advanced Video Coding (AVC) video compression standard developed with joint efforts by MPEG/Video Coding Expert Group (VCEG) that enables efficient encoding of sequences captured simultaneously from multiple cameras using a single video stream. The MVC standard can be applied to compress the 3D video, and may be used with 3D TV and free viewpoint television (FTV) systems that allow viewers to control the viewpoint of the scene on the screen. Additionally, MVC has backward compatibility with H.264/AVC codecs, which makes possible its wide application in different devices that can display 2D and 3D images.

Autostereoscopic 3D displays allow for the display of three-dimensional images that can be viewed without the use of special headgear or glasses. These methods produce depth perception to the viewer even though the image is produced by a flat device. Several technologies exist for autostereoscopic 3D displays. Currently, most flat-panel solutions employ lenticular lenses or a parallax barrier. If the viewer positions his or her head in certain viewing positions, he or she will perceive a different image with each eye, resulting in a stereo image. Such displays can have multiple viewing zones allowing multiple users to view the image at the same time.

The current 3D video systems require multi-camera arrays to generate 3D video content. This requirement of multi-camera arrays makes the overall system cost and complexity high, limiting the widespread use of 3D video.

SUMMARY OF THE INVENTION

An aspect of the present invention is to address at least the above-mentioned problems and/or disadvantages and to provide at least the advantages described below. Accordingly, an aspect of the present invention is to provide an apparatus and method for capturing 3D video using multiple independent 2D video capture devices.

According to an aspect of the present invention, a video capture device for capturing video to be transformed into 3D video is provided. The video capture device includes a camera module for capturing a two-dimensional (2D) video stream, a location module for determining a location of the video capture device, an orientation module for determining an orientation of the video capture device, and a processing module for associating additional information with the 2D video stream captured by the camera module, the additional information including the orientation of the video capture device and the location of the video capture device.

According to another aspect of the present invention, a system for generating 3D video based on a plurality of 2D video streams is provided. The system includes a plurality of video capture devices for capturing 2D video, and a 3D video generator including a 3D video generation module for generating the 3D video based on the 2D video streams received from each of the plurality of video capture devices.

According to another aspect of the present invention, a three-dimensional (3D) video generator for generating 3D video from a plurality of two-dimensional (2D) video streams is provided. The 3D video generator includes a communication module for receiving a plurality of 2D video streams, each of the plurality of 2D video streams received from a different video capture device, and a 3D video generation module for generating the 3D video based on the plurality of 2D video streams and additional information included in each of the plurality of 2D video streams, the additional information relating to the corresponding video capture device.

According to another aspect of the present invention, a method of generating three-dimensional (3D) video is provided. The method includes capturing two-dimensional (2D) video frames, generating a 2D video stream including the captured 2D video frames, appending additional information about the 2D video stream to the 2D video stream, transmitting the 2D video stream including the additional information to a 3D video generator, and receiving a 3D video based on the 2D video stream from the 3D video generator.

According to another aspect of the present invention, a method of generating three-dimensional (3D) video is provided. The method includes receiving 2D video streams from a plurality of video capture devices, extracting additional information from each of the plurality of 2D video streams, and generating the 3D video based on the plurality of 2D video streams and the extracted additional information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
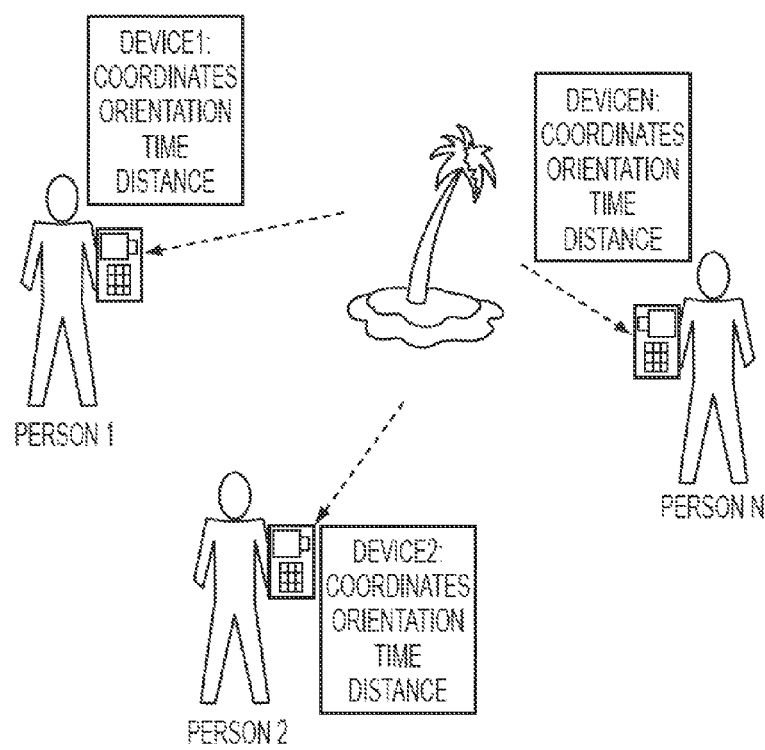
FIG. 1 illustrates the capturing of 3D video with multiple independent video capture devices according to an exemplary embodiment of the present invention.

FIG. 1 illustrates the capturing of 3D video with multiple video capture devices according to an exemplary embodiment of the present invention.

Referring to FIG. 1, video capturing devices 1-N can be any device equipped with a camera or camcorder, such as a mobile phone, Personal Digital Assistant (PDA), personal entertainment device, laptop computer, or the like. The video capturing devices can be equipped with one or more of a Global Positioning System (GPS) receiver, a gyroscope, accelerometer, a compass, etc., to obtain the location coordinates (latitude, longitude and altitude) and orientation information of the video capturing device. Moreover, the video capture device can determine the distance to the object being photographed with a rangefinder or from the camera zoom/focus information.

Each of the devices may obtain its location information and orientation. From this information, a distance between each device and the object being photographed can be calculated. The devices may also obtain timing information corresponding to the captured video. The video capture devices 1-N may coordinate to capture video of the same object or scene, or may capture video independently of each other. In either case, a 3D video generation device can use the 2D video of the object captured at the same time from multiple devices, together with corresponding location, orientation, and time information, to generate a 3D image. An exemplary implementation of a video capture device is described below with respect to FIG. 2.

Figure 2:
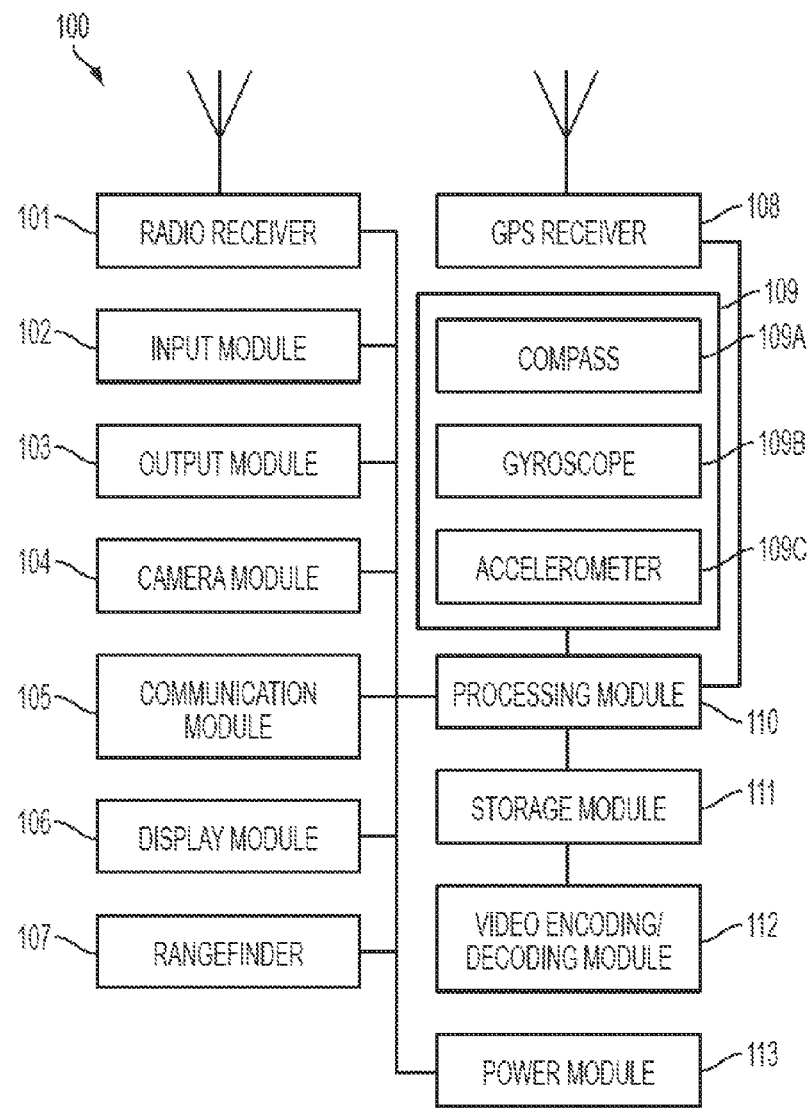
FIG. 2 illustrates a video capture device according to an exemplary embodiment of the present invention.

FIG. 2 illustrates a video capture device 100 according to an exemplary embodiment of the present invention.

Referring to FIG. 2, the video capture device 100 includes a radio receiver 101, an input module 102, an output module 103, a camera module 104, a communication module 105, a display module 106, a rangefinder 107, a GPS receiver 108, an orientation module 109, a processing module 110, a storage module 111, a video encoding/decoding module 112, and a power module 113. Additional exemplary embodiments may include additional modules. Similarly, the functionality of two or more of the above modules may be integrated into a single component.

The camera module 104 implements functions of a camera for capturing video or still images. The GPS receiver 108 may be used to obtain the location coordinates (latitude, longitude and altitude) as well as timing information. Instead of GPS, other global satellite navigation systems may be used as they come online, such as the Galileo system currently in development by the European Union.

The orientation module 109 determines the orientation of the video capture device 100. The orientation module 109 may include a compass 109A, a gyroscope 109B, an accelerometer 109C, or a combination of these modules. The rangefinder 107 can be used to determine the distance of the object being photographed from the video capture device.

The user may interact with the video capture device 100 via the input module 102 and the output module 103. The input module 102 takes various user inputs such as camera zoom/focus control, while the output module 103 controls various types of outputs such as displaying status indicators on the display. The output module 103 may be provided as a Liquid Crystal Display (LCD). In this case, the output module 103 may include a controller for controlling the LCD, a video memory in which image data is stored and an LCD element. If the LCD is provided as a touch screen, the output module 103 may perform a part or all of the functions of the input module 102.

The communication module 105 communicates with other devices either directly or via a network. The radio receiver 101 allows wireless communication with other devices or the network. Although the radio receiver 101 is shown in FIG. 2, other forms of wireless communication are also possible and may be included in addition to or instead of the radio receiver 101.

The processing module 110 processes video captured by the camera module 104. The video encoding/decoding module 112 compresses/decompresses the captured video. The processed video is then either stored on the device in the storage module 111 or transferred to a 3D video generator device via a wired or a wireless link. The power module 113 supplies and manages power to the video capture device 100. An example of capturing video using the video capture device 200 is described below with respect to FIG. 3.

Figure 3:
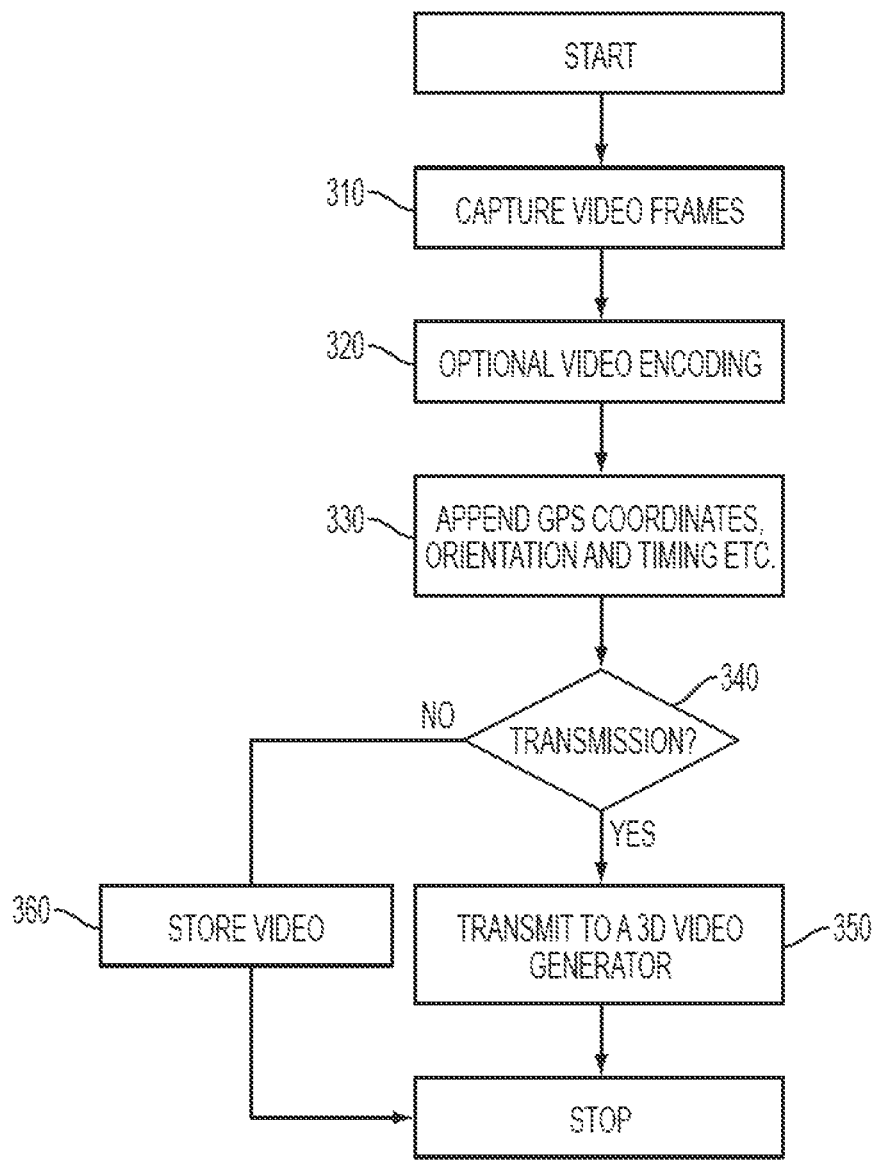
FIG. 3 is a flowchart illustrating video capture according to an exemplary embodiment of the present invention.

FIG. 3 is a flowchart illustrating video capture of 2D video according to an exemplary embodiment of the present invention.

Referring to FIG. 3, video frames are captured by the camera module 104 in step 310 and combined to form a 2D video stream. In step 320, an optional video compression (encoding) can be performed on the captured 2D video to reduce the amount of information that needs to be stored or transmitted for efficiency or other purposes. The video capture device 100 may also append additional information to the 2D video stream in step 330.

The additional information may be in the form of metadata. This additional information may include GPS coordinates of the video capture device 100, device orientation, GPS time, and the like. In addition to metadata about the 2D video stream, each video frame may also have associated metadata. If the capturing device is moving while capturing the video, each frame may have different orientation, time, and location information. In these situations, adding metadata to individual frames can result in a more accurate measurement of the associated information.

The resulting video stream or file is then either stored for future processing in step 360 or transmitted to a 3D video generation device in step 350. The 3D functions of the 3D video generation device may in addition or alternatively be located in a 3D video generation device located remotely from the plurality of video capture devices. An exemplary implementation of such a 3D video generation device is described below with respect to FIG. 4.

Figure 4:
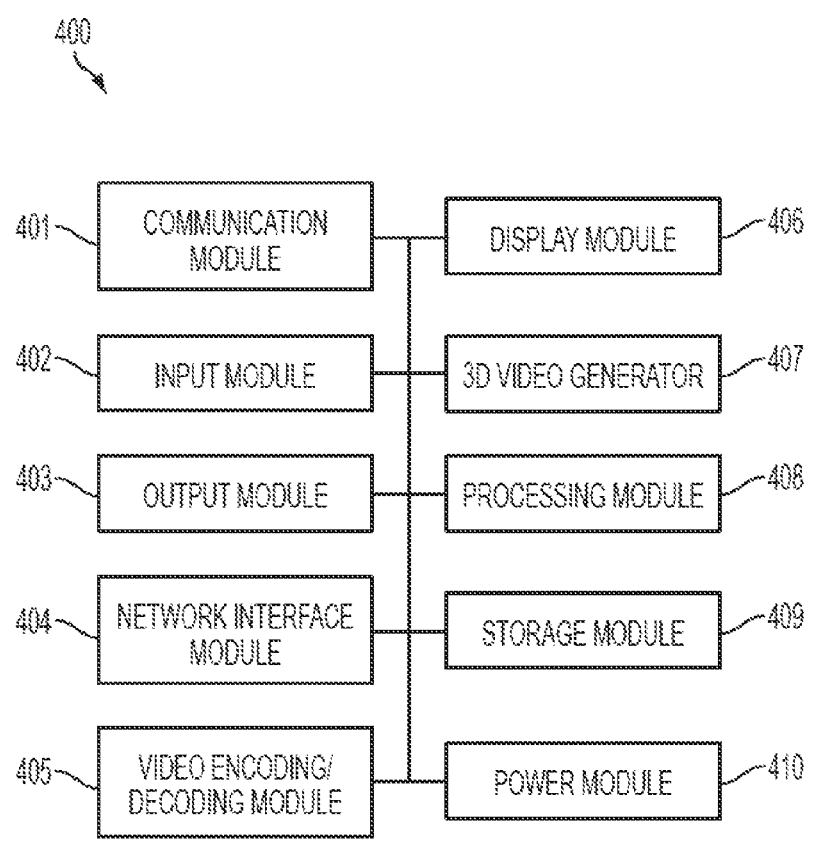
FIG. 4 illustrates a 3D video generation device or server according to an exemplary embodiment of the present invention.

FIG. 4 illustrates a 3D video generation device 400 according to an exemplary embodiment of the present invention. The 3D video generation device 400 may be a server or another device, including the video capture device 100.

Referring to FIG. 4, the 3D video generation device 400 includes a communication module 401, an input module 402, an output module 403, a network interface module 404, a video encoding/decoding module 405, a display module 406, a 3D video generator 407, a processing module 408, a storage module 409, and a power module 410. The operation of the input module 402, the output module 403, the video encoding/decoding module 405, the display module 406, the processing module 408, the storage module 409, and the power module 410 is generally similar to the operation of the corresponding modules in the video capture and transmission device 100, and thus further description of these modules is omitted for the sake of brevity.

The 3D video generator 407 is capable of communicating with video capture devices via the network interface module 404 and the communication module 401. This communication can happen either directly or via a network, such as the Internet. Furthermore, the 3D video generator 407 is capable of generating a 3D video from the 2D videos by using additional information, such as GPS coordinates, orientation, and timing information received from the individual video capture devices. An example of the interaction between the 3D video generation device 400 and video capture devices is described below with respect to FIG. 5.

Figure 5:
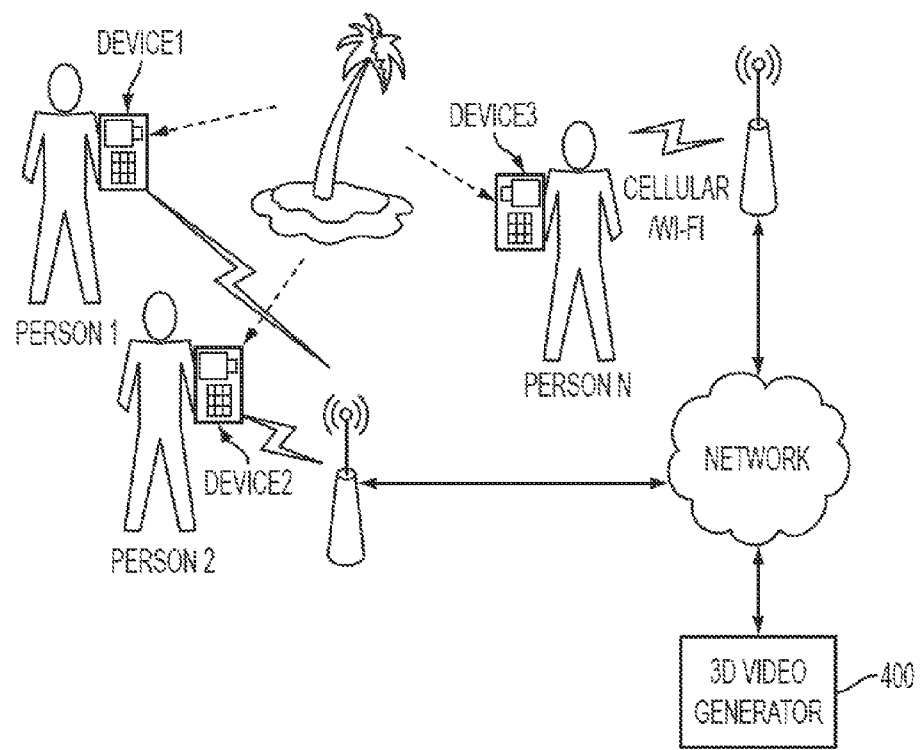
FIG. 5 illustrates the capturing of video with multiple video capture devices according to an exemplary embodiment of the present invention.

FIG. 5 illustrates the capturing of a video with a plurality of video capture devices according to an exemplary embodiment of the present invention.

Referring to FIG. 5, the video capture devices 1-N (such as the video capturing device 100) forward the independent video streams they capture along with the GPS coordinates, orientation, and timing information to the 3D video generation device 400 over a network, which may include a combination of wireless and wired links. While described as being on the same network, the video capture devices may also operate on different networks. For example, the video capture device of Person1 could operate on a cellular network and communicate with the 3D video generation device 400 via the cellular network, while the video capture device of Person2 can operate on a Wi-Fi network. A fourth video capture device (not shown) could be connected via Ethernet or other wired link.

The 3D video generation device 400 can create a 3D video from the 2D videos received from the individual video capture devices. The 3D video generation device 400 can either store the created 3D video for later use or send the 3D video to the video capture device 100, or possibly to other devices interested in receiving the created 3D video. The video capture device 100 can in turn transmit the 3D video to other devices. Another example of the interaction between the 3D video generation device 400 and video capture devices is described below with respect to FIG. 6

Figure 6:
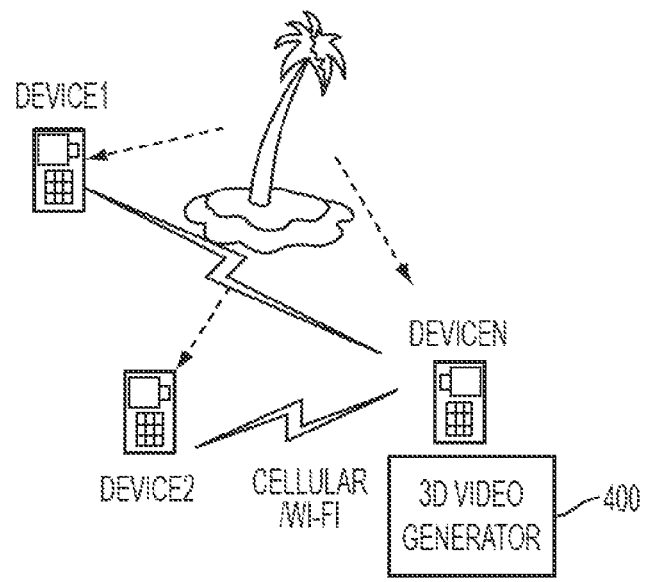
FIG. 6 illustrates the transferring of captured video to a 3D video generator according to an exemplary embodiment of the present invention.

FIG. 6 illustrates the transferring of captured video to a 3D video generator according to an exemplary embodiment of the present invention.

Referring to FIG. 6, one of the video capture devices also implements functions of the 3D video generator 400. In the example of FIG. 6, DeviceN serves both as a video capture device as well as 3D video generator. DeviceN in this case receives 2D video and additional information (e.g., GPS coordinates, orientation, timing, etc.) from Device1 and Device2 (and possibly other devices as well) and creates a 3D video which can either be displayed, stored, or transmitted to the video capture device 100 or other devices. An example of capturing 3D video with a plurality of video capture devices is described below with respect to FIG. 7.

Figure 7:
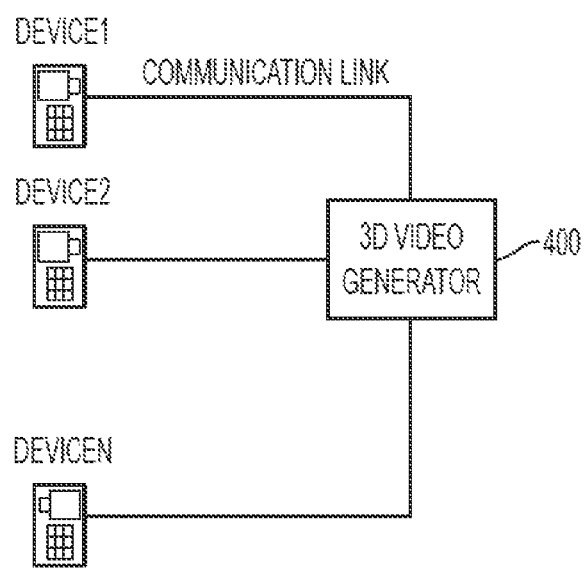
FIG. 7 illustrates the capturing of 3D video with multiple video capture devices according to an exemplary embodiment of the present invention.

FIG. 7 illustrates the capturing of a 3D video with a plurality of video capture devices according to an exemplary embodiment of the present invention.

Referring to FIG. 7, video capture devices Device1, Device2, and DeviceN upload the captured 2D videos to the 3D video generation device 400 offline. The 3D video generation device 400 makes use of the timing information embedded in, or otherwise associated with, each of the 2D streams for synchronization of frames from different video capture devices. A 3D video is then created by using the additional information (e.g., orientation etc.) embedded in, or otherwise associated with, the individual 2D streams. The generated 3D video can then either be stored for future use or displayed on either the 3D video generator or communicated to the video capture devices and displayed thereon. An exemplary operation for generating 3D video is described below with respect to FIG. 8.

Figure 8:
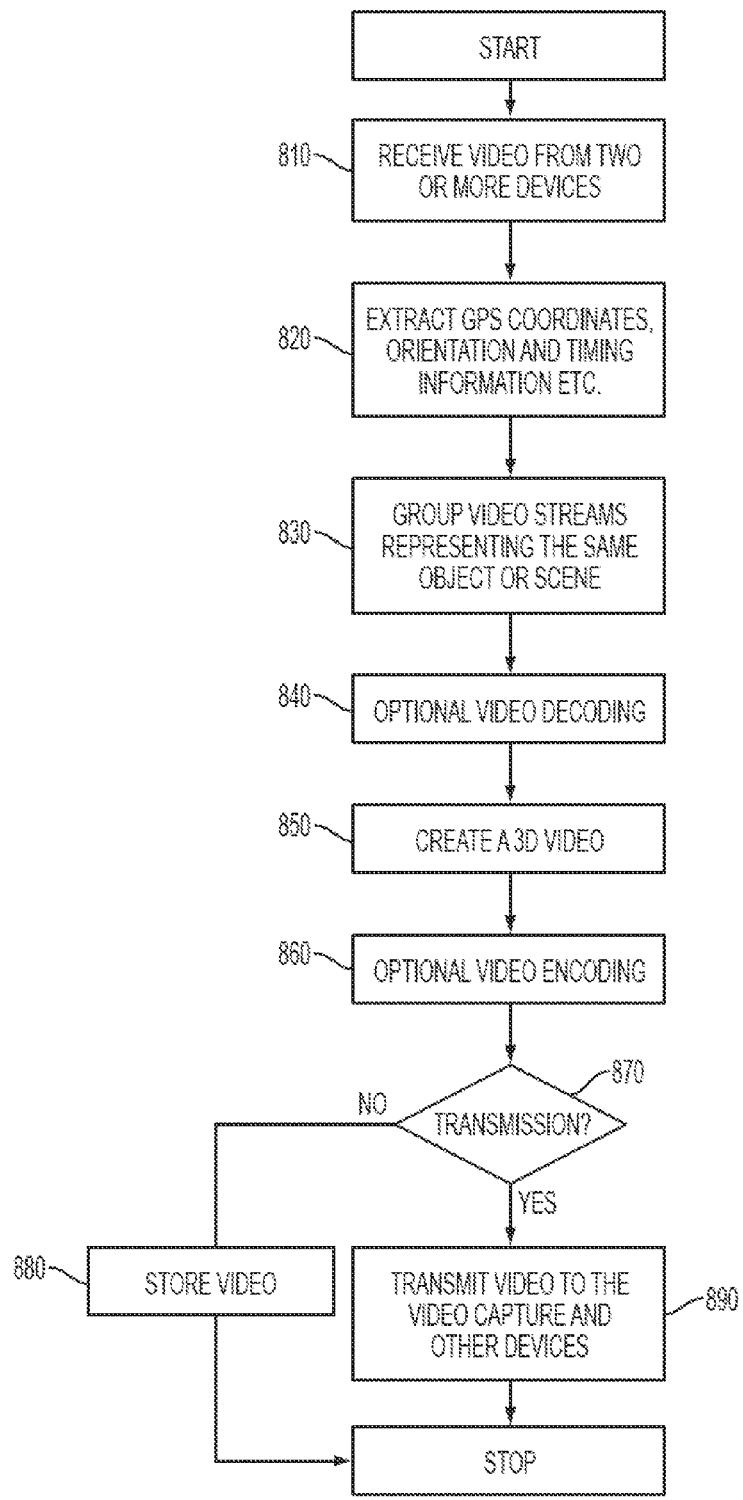
FIG. 8 is a flowchart illustrating 3D video generation according to an exemplary embodiment of the present invention.

FIG. 8 is a flowchart illustrating 3D video generation according to an exemplary embodiment of the present invention.

Referring to FIG. 8, the 3D video generation device 400 receives 2D video streams from two or more video capture devices 100 in step 810. The 3D video generation device 400 then extracts additional information embedded in the 2D video streams in step 820. This information may be contained in the stream metadata. The additional information includes one or more of the stream IDentity (ID), GPS coordinates, orientation, timing or distance to the object photographed, etc.

The 3D video generation device 400 then groups video streams representing the same object or scene in step 830. This can be done using one or more of the stream ID information, image and/or pattern recognition, coordinates of the scene photographed, etc. If the video streams were compressed (e.g., encoded), then the video streams in the group are decompressed (e.g., decoded) in step 840. The 3D video generation device 400 then creates a 3D video in step 850 by using the additional information and the grouped 2D video frames. The 3D video stream can then be optionally compressed for storage or transmission in step 860.

In step 870, the 3D video generation device 400 determines whether to store the generated 3D video in step 880 or transmit the generated 3D video to another device in step 890. The storage step 880 and the transmission step 890 are not mutually exclusive: in some exemplary embodiments, the 3D video generator may both store the 3D video in the storage module 409 in step 880 and transmit the 3D video in step 890. In some cases, a mix of 2D and 3D video may be generated. The generation of mixed 2D and 3D video is described below with respect to FIG. 9.

Figure 9:
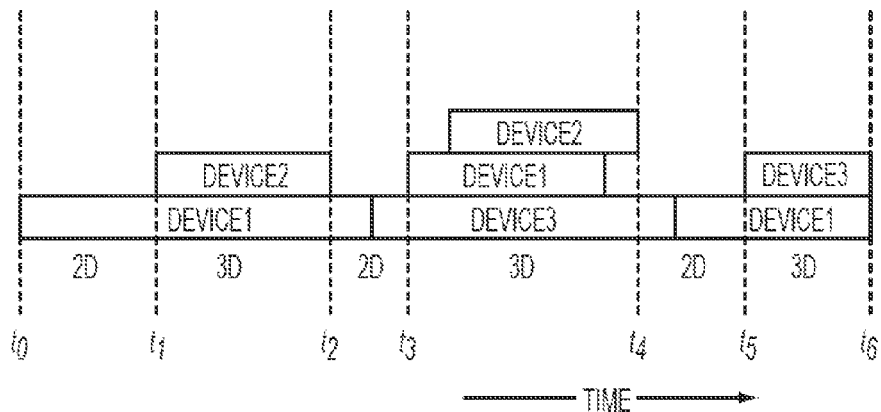
FIG. 9 illustrates a mix of 2D and 3D video based on the number of devices that captured video for a particular time slot according to an exemplary embodiment of the present invention.

FIG. 9 illustrates a mix of 2D and 3D video based on the number of devices that captured video for a particular time slot according to an exemplary embodiment of the present invention.

Referring to FIG. 9, a 3D video is generated when, for a particular time segment, more than one video device captures corresponding 2D video. In the example of FIG. 9, video is captured by several devices between time segment $t_0$ and time segment $t_6$. As can be seen in FIG. 9, in some time segments, multiple devices are capturing video; this is the case for time segments $(t_2-t_1)$, $(t_4-t_3)$, and $(t_6-t_5)$. For the remaining time segments, video is captured from a single device. When video is captured from only one device, only a 2D video can generally be created. Thus, the resulting video will include 3D video in those time segments where 3D video can be generated, and 2D video in those time segments where only 2D video can be generated.

In some cases, it may be possible to generate 3D video even for those time segments in which only one video device captures 2D video. In these cases, depth information can be extracted from the 2D video, and 3D video can be generated using the 2D video and the extracted depth information via known techniques. While the quality of 3D video generated in this fashion is usually lower than 3D video generated using multiple 2D video streams, these techniques can be employed if a full 3D video is desired.

The mixed 2D and 3D video can be viewed using, for example, autostereoscopic displays, or other displays that are capable of displaying both 2D and 3D images. An exemplary method of generating mixed 2D and 3D video is described below with respect to FIG. 10.

Figure 10:
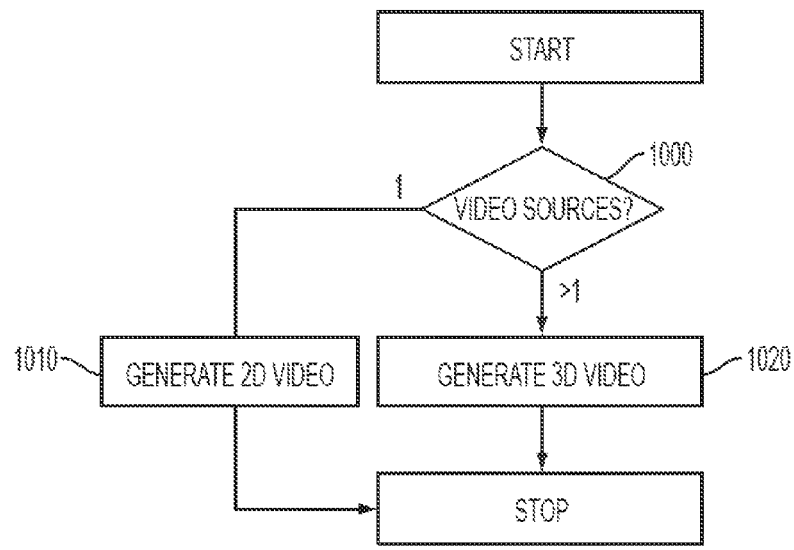
FIG. 10 is a flowchart illustrating 3D video generation according to an exemplary embodiment of the present invention.

FIG. 10 is a flowchart illustrating 3D video generation according to an exemplary embodiment of the present invention.

Referring to FIG. 10, the 3D video generation device 400 determines how many devices captured video for a corresponding time segment in step 1000. If a single video source is available for the corresponding time segment, then the 3D video generation device generates 2D video for that time segment in step 1010. If multiple video sources are available for the same object or scene in the corresponding time segment, then the 3D video generation device 400 generates a 3D video in step 1020.

Several techniques can be employed to generate the 3D video in step 1020. For example, two separate 2D video streams can be generated. One of the two video streams is presented to the right eye, and the other of the two streams is presented to the left eye, creating a 3D stereoscopic effect. According to another technique, depth information can be estimated using the received 2D video streams, and 3D video is generated based on one of the received 2D video streams and the estimated depth information. Since the depth information is estimated based on two or more received 2D video streams, the resulting estimates will be more accurate than an estimate based on just one 2D video stream. Other techniques for generating 3D video may also be employed.

Figure 11A:
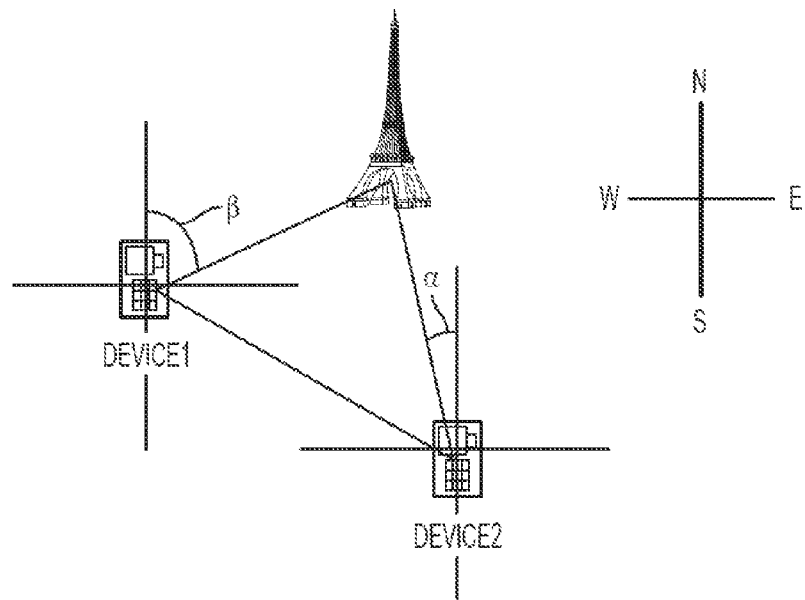
FIGS. 11A-11C illustrate viewing angles from a plurality of video capture devices according to exemplary embodiments of the present invention.
Figure 11B:
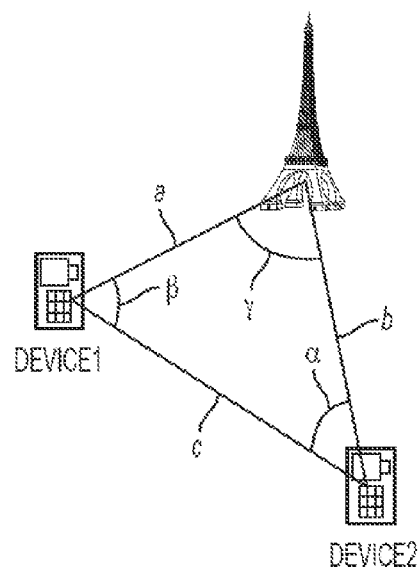
Figure 11C:
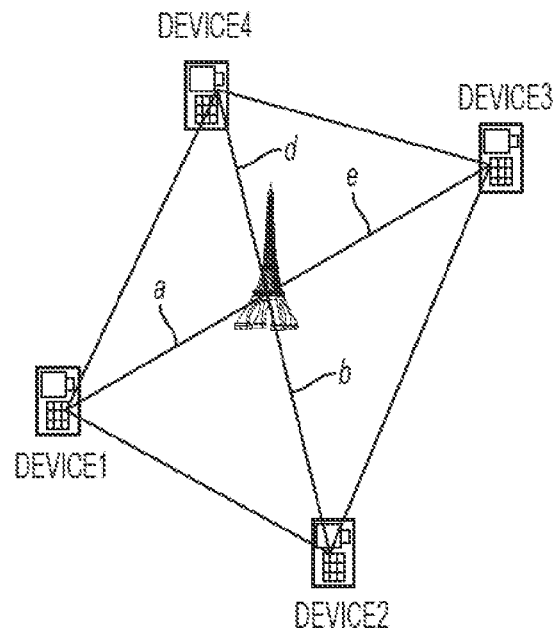

FIGS. 11A-11C illustrate viewing angles from two video capture devices according to exemplary embodiments of the present invention.

Referring to FIG. 11A, viewing angles to the object or scene photographed by independent video capture devices can be determined based on their orientations. The orientation information can be obtained from the orientation module 109. As shown in FIG. 11A, the viewing angles $\alpha$ and $\beta$ can be determined based on the deviation from the north (N) direction. From the orientation of individual video capture devices, the viewing angles $\alpha$ and $\beta$ to the object or scene photographed can be determined. The determination of the northerly direction can be made using a compass in the video capture device. The information on viewing angles is used by the 3D video generation device to create a 3D video.

FIG. 11B illustrates viewing angles from two video capture devices according to an exemplary embodiment of the present invention.

Referring to FIG. 11B, viewing angles to the object or scene photographed by independent video capture devices can be determined based on their relative location and their distance to the object or scene photographed. An example for the case of two video capture devices is shown in FIG. 11B.

In the example of FIG. 11B, a and b denote the distance from Device1 and Device2 respectively to the object or scene photographed. This information can be obtained from the rangefinder modules 107 in the video capture devices or can be derived from the zoom and/or focus information when the object or scene is shot. The distance c between the two devices can be obtained by the location information of the two devices.

Once all three sides of the triangle in FIG. 11B are known, the three angles $\alpha$, $\beta$, and $\gamma$ can be determined using Equation 1.1:

$$\alpha = \arccos\left(\frac{b^2 + c^2 - a^2}{2bc}\right)$$
$$\beta = \arccos\left(\frac{a^2 + c^2 - b^2}{2bc}\right)$$
$$\gamma = \arccos\left(\frac{a^2 + b^2 - c^2}{2bc}\right)$$

Equation 1.1

The 3D video generation device 400 can use relative angles of the two devices, in addition to other information, in creating the 3D video of the object or scene that is photographed by the video capture devices.

FIG. 11C illustrates viewing angles from four video capture devices according to an exemplary embodiment of the present invention.

Referring to FIG. 11C, the distances to the object photographed can be determined without using rangefinder or camera zoom and/or focus information as shown in FIG. 11C for the case of four video capture devices. The distances between different video capture devices can be determined from their GPS location information. In the example of FIG. 11C, (a+e) represents the distance between Device 1 and Device 3, and (b+d) represents the distance between Device 2 and Device 4. The intersection of the two straight lines (a+e) and (b+d) represents the location of the object photographed. From this information, the distances to the object from Device 1, Device 2, Device 3 and Device 4 as a, b, e, and d, respectively, can be determined. Once the distances between different video capture devices and their distance to the object are known, their view angles can be determined using the principle illustrated in the example of FIG. 11B above.

The principles of angle determination for the case of 2D location (latitude, longitude) have been described. Those skilled in the art would appreciate that these principles can be easily extended to locations and angles in 3D where object photographed and the devices can be at different elevations (different altitudes). An example of determining coordinates of a photographed object is described below with respect to FIG. 12.

Figure 12:
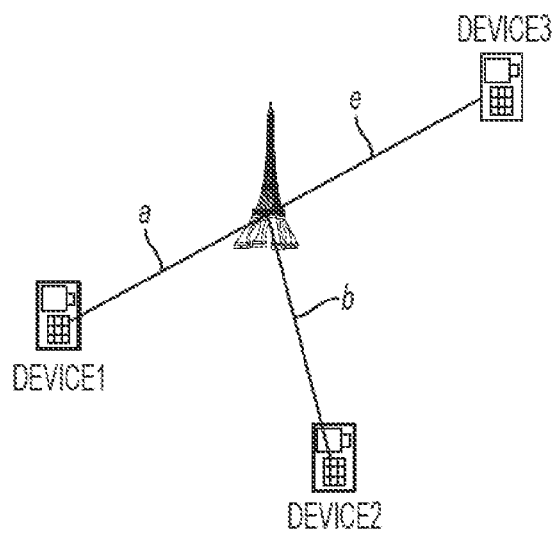
FIG. 12 illustrates the determination of coordinates of the object photographed according to an exemplary embodiment of the present invention.

FIG. 12 illustrates the determination of coordinates of the object photographed according to an exemplary embodiment of the present invention.

Referring to FIG. 12, the coordinates of the object photographed can be determined from the location of the three video capture devices Device 1, Device 2, and Device 3. For example, once the location of the three video capture devices is known from their coordinates (for example, GPS coordinates) and their distances a, e, and b to the object photographed, the coordinates of the object photographed can be determined using principle of triangulation. This information on coordinates of the object photographed can also be used by the 3D video generation device 400 when grouping video streams for the same object or scene for creation of 3D video. An example of capturing video is described below with respect to FIG. 13.

Figure 13:
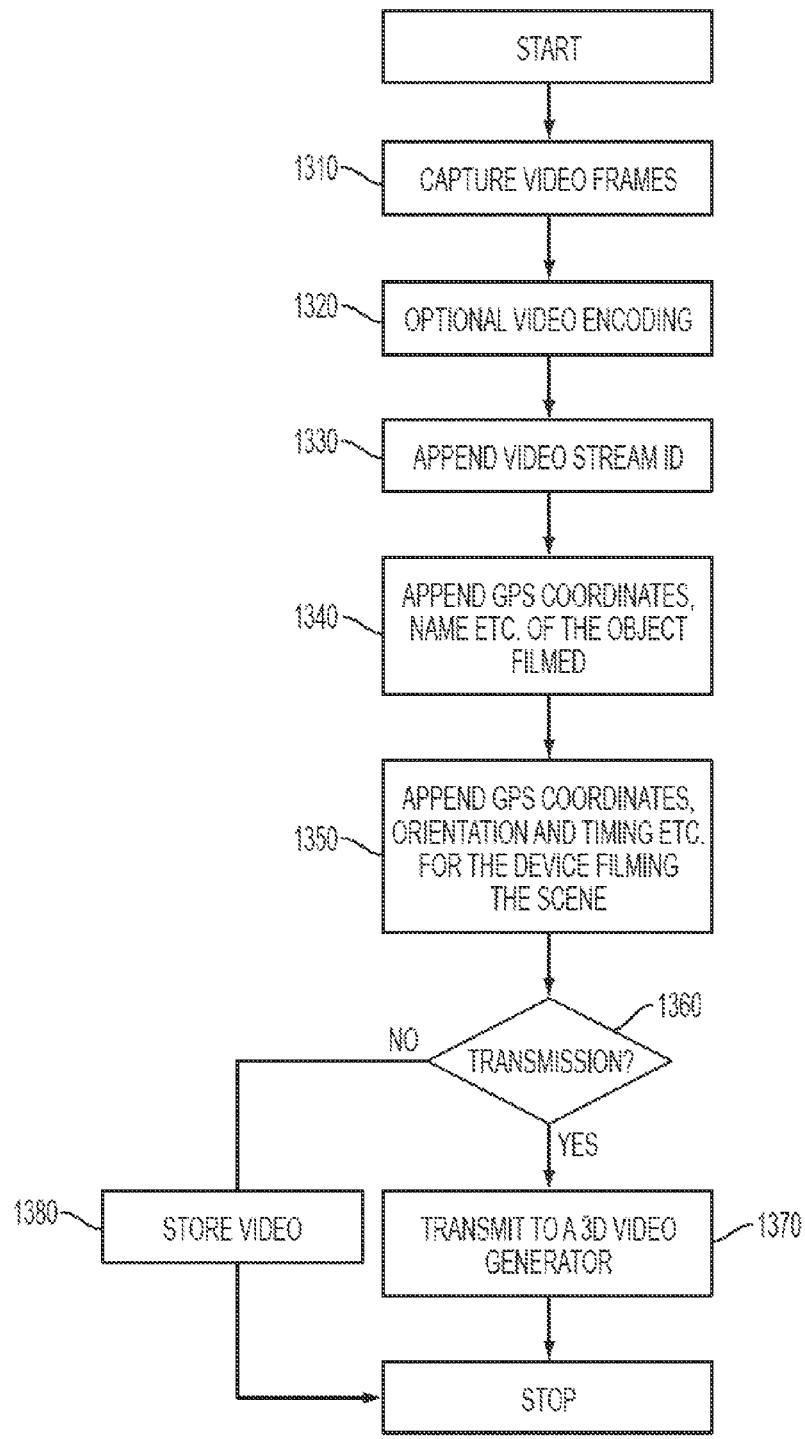
FIG. 13 is a flowchart illustrating video capture according to an exemplary embodiment of the present invention.

FIG. 13 is a flowchart illustrating video capture according to an exemplary embodiment of the present invention.

Referring to FIG. 13, the video capture device 100 captures the video using any of a number of techniques in step 1310. Although not required in all embodiments, in step 1320 the video capture device 100 may encode the video. In step 1330, a video stream ID is appended to, or otherwise associated with, the video stream to assist in identification of the stream by the 3D video generation device 400. In step 1340, additional information is appended to, or otherwise associated with, the video metadata, such as coordinates of the object filed and the object name in the video metadata. This information can then be used by the 3D video generator when grouping video streams for the same object or scene for creation of 3D video. In step 1360, the video capture device determines whether to the store the captured video or to transmit the captured video to the 3D video generation device 400. Based on the results of the determination, the video capture device 200 stores the video stream in the storage module 111 in step 1380, or transmits the video stream to the 3D video generation device 400 in step 1370. Of course, the video capture device 200 may perform both operations, and is not limited to performing one or the other.

Although the exemplary embodiments of the present invention have been described herein with respect to generation of 3D video, embodiments of the present invention are not limited thereto. For example, exemplary embodiments of the present invention may generate 3D still images from 2D still photographs based on the techniques described above.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A video capture device for capturing video to be transformed into 3D video, the video capture device comprising:
   a camera module for capturing a two-dimensional (2D) video stream;
   a location module for determining a location of the video capture device;
   an orientation module for determining an orientation of the video capture device;
   a processing module for associating additional information with each frame of the 2D video stream captured by the camera module, the additional information including the orientation of the video capture device and the location of the video capture device,
   a communication module for receiving at least one additional 2D video stream having appended additional information for each frame of the at least one additional 2D video stream from at least one other video capture device that is not under the control of the video capture device; and
   a three-dimensional (3D) video generation module for generating a 3D video based on the 2D video stream and the at least one additional 2D video stream,
   wherein the 3D video is generated based on a viewing angle for each of a plurality of video capture devices that is calculated according to $$\alpha = \arccos\left(\frac{b^2 + c^2 - a^2}{2bc}\right)$$

$$\beta = \arccos\left(\frac{a^2 + c^2 - b^2}{2bc}\right)$$

$$\gamma = \arccos\left(\frac{a^2 + b^2 - c^2}{2bc}\right)$$

where a denotes a distance between a first video capture devices and a particular object being filmed, b denotes a distance between a second video capture devices and the particular object being filmed, c denotes a distance between the first video capture device and the second video capture device, α denotes a viewing angle of the second video capture device, β denotes a viewing angle of the first video capture device, and γ denotes an angle formed by a line connecting the first video capture device to the particular object being filmed and a line connecting the second video capture device to the particular object being filmed.

2. The video capture device of claim 1, further comprising:
   a rangefinder module for determining a distance between the video capture device and an object being photographed;

wherein the additional information includes the distance between the video capture device and the object being photographed.

3. The video capture device of claim 1, wherein the orientation module includes at least one of a gyroscope, a compass, and an accelerometer.

4. The video capture device of claim 1, wherein the location module comprises a Global Positioning System (GPS) receiver.

5. The video capture device of claim 1, further comprising:
a communication module for transmitting the 2D video stream to a 3D video generation module and for receiving 3D video based on the 2D video stream from the 3D video generation module.

6. The video capture device of claim 1, wherein the processing module determines a distance between the video capture device and the object being filmed based on zoom and focus information of the camera module.

7. A system for generating 3D video based on a plurality of 2D video streams, the system comprising:
a plurality of video capture devices for capturing 2D video and associating additional information with each frame of the 2D video; and
a 3D video generator including a 3D video generation module for generating the 3D video based on the 2D video streams, a viewing angle for each of the plurality of video capture devices, and the additional information received from each of the plurality of video capture devices,
wherein none of the video capture devices are controlled by any other of the video capture devices, and
wherein the 3D generation module determines the viewing angle for each of the plurality of video capture devices according to $$\alpha = \arccos\left(\frac{b^2 + c^2 - a^2}{2bc}\right)$$

$$\beta = \arccos\left(\frac{a^2 + c^2 - b^2}{2bc}\right)$$

$$\gamma = \arccos\left(\frac{a^2 + b^2 - c^2}{2bc}\right)$$

where a denotes a distance between a first of the plurality of video capture devices and a particular object being filmed, b denotes a distance between a second of the plurality of video capture devices and the particular object being filmed, c denotes a distance between the first video capture device and the second video capture device, $\alpha$ denotes a viewing angle of the second video capture device, $\beta$ denotes a viewing angle of the first video capture device, and $\gamma$ denotes an angle formed by a line connecting the first video capture device to the particular object being filmed and a line connecting the second video capture device to the particular object being filmed.

8. A three-dimensional (3D) video generator for generating 3D video from a plurality of two-dimensional (2D) video streams, the 3D video generator comprising:
a communication module for receiving a plurality of 2D video streams, each of the plurality of 2D video streams received from a different video capture device that is not under the control over the 3D video generator; and
a 3D video generation module for generating the 3D video based on the plurality of 2D video streams, a viewing angle for each of a plurality of video capture devices, and additional information for each frame of the plurality of 2D video streams included in each of the plurality of 2D video streams, the additional information relating to the corresponding video capture device,
wherein the 3D generation module determines the viewing angle for each of the plurality of video capture devices according to $$\alpha = \arccos\left(\frac{b^2 + c^2 - a^2}{2bc}\right)$$

$$\beta = \arccos\left(\frac{a^2 + c^2 - b^2}{2bc}\right)$$

$$\gamma = \arccos\left(\frac{a^2 + b^2 - c^2}{2bc}\right)$$

where a denotes a distance between a first of the plurality of video capture devices and a particular object being filmed, b denotes a distance between a second of the plurality of video capture devices and the particular object being filmed, c denotes a distance between the first video capture device and the second video capture device, $\alpha$ denotes a viewing angle of the second video capture device, $\beta$ denotes a viewing angle of the first video capture device, and $\gamma$ denotes an angle formed by a line connecting the first video capture device to the particular object being filmed and a line connecting the second video capture device to the particular object being filmed.

9. The 3D video generator of claim 8,
wherein the 3D video generation module synchronizes the plurality of 2D video streams using timing information in the additional information,
wherein the 3D video generation module divides the plurality of 2D video streams into groups, each group corresponding to the particular object or a scene, and
wherein the 3D video generation module generates the 3D video corresponding to the particular object or scene based on the additional information.

10. The 3D video generator of claim 9, wherein the 3D video generation module divides the plurality of 2D video streams into groups based on at least one of stream ID information included in the additional information, image or pattern recognition of objects or scenes included in the plurality of 2D video streams, and coordinates of a scene being filmed.

11. The 3D video generator of claim 9, wherein the additional information comprises at least one of stream information of the corresponding 2D video stream, Global Positioning System (GPS) coordinates of the corresponding video capture device, orientation of the corresponding video capture device, timing information of the corresponding 2D video stream, and distance to an object or scene being filmed.

12. The 3D video generator of claim 9,
wherein the 3D video generation module identifies time segments in the plurality of 2D video streams in a group, the time segments being time segments in which two or more of the plurality of video capture devices captured video of the particular object or scene corresponding to the group,
wherein the 3D video generation module generates 3D video for the time segments in which two or more of the plurality of video devices captured video of the particular object or scene corresponding to the group, and wherein the 3D video generation module generates 2D video for remaining time segments in which only one video capture device captured video of the particular object or scene corresponding to the group.

13. The 3D video generator of claim 9, wherein the 3D video generation module determines a distance (a +e) between the first of the plurality of video capture devices and a third of the plurality of video capture devices, determines a distance (b +d) between the second of the plurality of video capture devices and a fourth of the plurality of video capture devices, determines a location of the target object based on the distance (a +e) and the distance (b +d); and determines the distance a and the distance b based on the location of the target object.

14. The 3D video generator of claim 9, wherein the 3D video generation module determines the viewing angles of each of the plurality of video capture devices based on the orientation information of the plurality of video capture devices.

15. A method of generating three-dimensional (3D) video, the method comprising:
capturing two-dimensional (2D) video frames by a video capture device;
generating a 2D video stream including the captured 2D video frames;
appending additional information about the 2D video stream to each frame of the 2D video stream;
transmitting the 2D video stream including the additional information to a 3D video generator that is not under the control of, or controlled by, the video capture device; and
receiving a 3D video based on the 2D video stream from the 3D video generator,
wherein the 3D video includes a plurality of time segments, the time segments in which two or more video devices captured video including 3D video, and the time segments in which only one video capture device captured video including 2D video, and
wherein the 3D video is generated according to a viewing angle of each of a plurality of video capture devices that is calculated according to $$\alpha = \arccos\left(\frac{b^2 + c^2 - a^2}{2bc}\right)$$

$$\beta = \arccos\left(\frac{a^2 + c^2 - b^2}{2bc}\right)$$

$$\gamma = \arccos\left(\frac{a^2 + b^2 - c^2}{2bc}\right)$$

where a denotes a distance between a first of the plurality of video capture devices and a particular object, b denotes a distance between a second of the plurality of video capture devices and the particular object, c denotes a distance between the first video capture device and the second video capture device, α denotes a viewing angle of the second video capture device, β denotes a viewing angle of the first video capture device, and γ denotes an angle formed by a line connecting the first video capture device to the particular object and a line connecting the second video capture device to the particular object.

16. The method of claim 15, wherein the additional information includes at least one of:
orientation information of a video capture device capturing the 2D video;
time information indicating a time when the 2D video is captured;
location information of the video capture device;
location information of an object being filmed;
a name of the object being filmed; and
a video stream ID of the 2D video stream.

17. The method of claim 16, wherein the location information is GPS coordinates.

18. The method of claim 15, further comprising:
storing the 2D video stream with the additional information prior to transmitting the 2D video stream with the additional information.

19. The method of claim 15, further comprising:
determining a distance between a video capture device capturing the 2D video and an object being filmed;
wherein the appending of the additional information comprises appending the distance between the video capture device and the object being filmed to the 2D video stream.

20. The method of claim 19, wherein the determining of the distance between the video capture device and the object being filmed comprises:
determining the distance between the video capture device and the object being filmed based on zoom and focus information of a camera of the video capture device.

21. A method of generating three-dimensional (3D) video, the method comprising:
receiving, by a 3D video generator, 2D video streams from a plurality of video capture devices, no more than one of which is under the control of the 3D video generator;
extracting additional information from each frame of the plurality of 2D video streams;
determining a viewing angle of each of the plurality of video capture devices according to $$\alpha = \arccos\left(\frac{b^2 + c^2 - a^2}{2bc}\right)$$

$$\beta = \arccos\left(\frac{a^2 + c^2 - b^2}{2bc}\right)$$

$$\gamma = \arccos\left(\frac{a^2 + b^2 - c^2}{2bc}\right)$$

where a denotes a distance between a first of the plurality of video capture devices and a particular object, b denotes a distance between a second of the plurality of video capture devices and the particular object, c denotes a distance between the first video capture device and the second video capture device, α denotes a viewing angle of the second video capture device, β denotes a viewing angle of the first video capture device, and γ denotes an angle formed by a line connecting the first video capture device to the particular object and a line connecting the second video capture device to the particular object; and
generating the 3D video based on the plurality of 2D video streams, the determined viewing angles, and the extracted additional information.

22. The method of claim 21, further comprising:
synchronizing the plurality of 2D video streams based on timing information included in the additional information; and
grouping the plurality of 2D video streams into at least one group, based on the particular object or a scene included in the plurality of video streams;

wherein the generating of the 3D video includes generating 3D video corresponding to the particular object or scene, based on a group including 2D video streams of the particular object or scene and additional information contained in the 2D video streams included in the group.

23. The method of claim 22, wherein the dividing of the plurality of 2D video streams into at least one group comprises:
dividing the plurality of 2D video streams into groups based on at least one of stream ID information included in the additional information, image or pattern recognition of the particular object or scene included in the plurality of 2D video streams, and location information of the particular scene.

24. The method of claim 22, further comprising:
identifying time segments in the plurality of 2D video streams in a group, the time segments corresponding to time segments in which two or more of the plurality of video capture devices captured video of the particular object or scene corresponding to the group; and
generating 2D video for remaining time segments in which only one of the plurality of video capture devices captured video of the particular object or scene corresponding to the group;
wherein the generating of the 3D video comprises generating the 3D video for time segments in which two or more of the plurality of video capture devices captured video of the particular object or scene corresponding to the group.

25. The method of claim 21, wherein the determining of the viewing angle comprises:
determining a distance (a +e) between the first of the plurality of video capture devices and a third of the plurality of video capture devices;
determining a distance (b +d) between the second of the plurality of video capture devices and a fourth of the plurality of video capture devices;
determining a location of the object being filmed based on the distance (a +e) and the distance (b +d); and
determining the distance a and the distance b based on the location of the particular object.

26. The method of claim 22, further comprising:
determining the viewing angles of each of the plurality of video capture devices based on orientation information of the plurality of video capture devices.

* * * * *